UNITED STATES PATENT OFFICE.

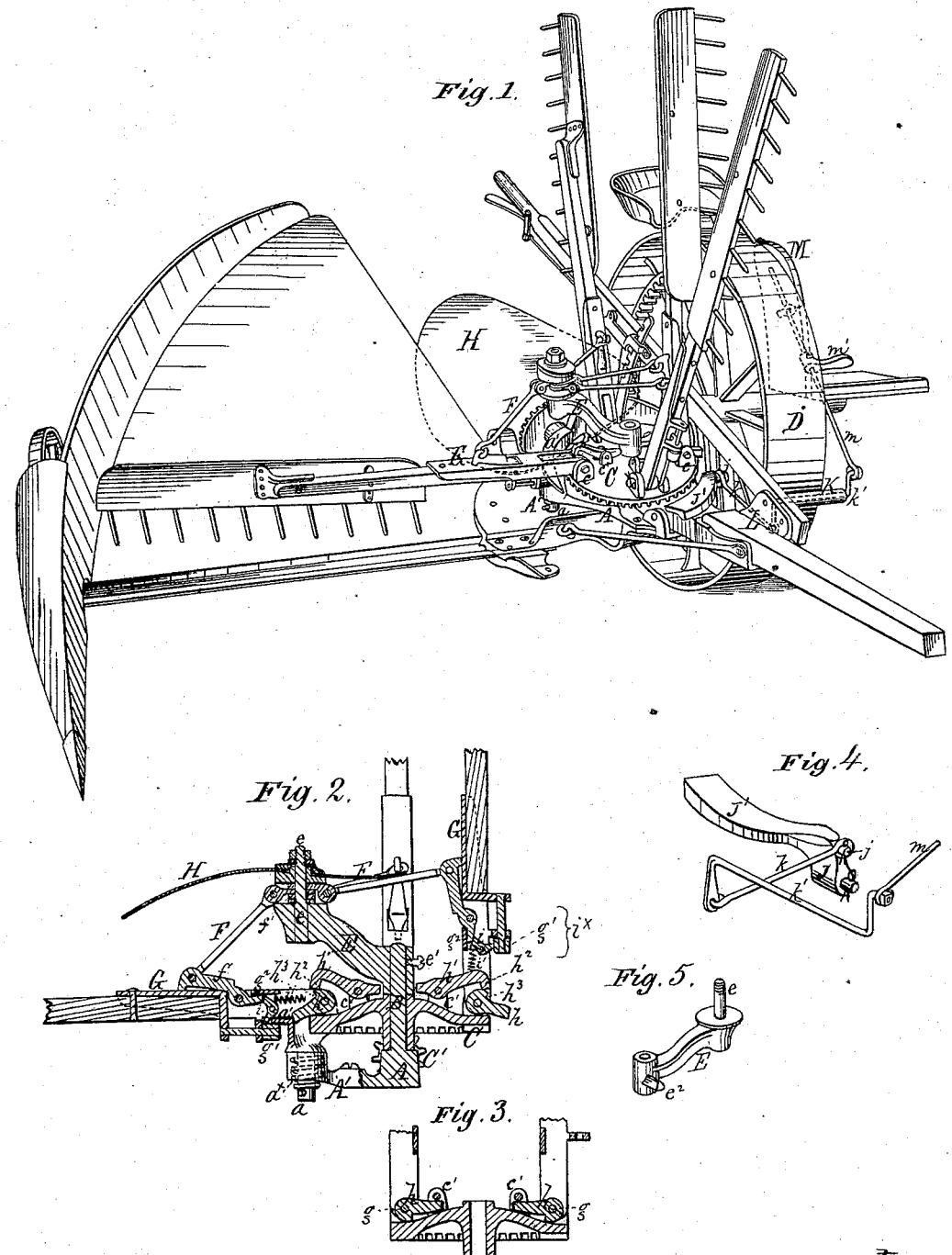

WILLIAM ANSON WOOD, OF ALBANY, NEW YORK.

IMPROVEMENT IN HARVESTER-RAKES.

Specification forming part of Letters Patent No. 163,127, dated May 11, 1875; application filed January 4, 1875.

*To all whom it may concern:*

Be it known that I, WILLIAM ANSON WOOD, of Albany, county of Albany, State of New York, have invented certain new and useful Improvements in Reaping-Machines, of which the following is a full, clear, and exact description, reference being had to the accompanying drawing, making part of this specification, in which—

Figure 1 represents a perspective view of the improved machine. Fig. 2 is a vertical section through the rake and reel shaft, showing the parts in position for causing the arms of the combined rake and reel to act as rake-arms. Fig. 3 is a partial view of the same, with the parts in position to cause the arms to act as reel-arms. Fig. 4 is a perspective view of the pivoted track or way for tripping the arms set to act as rake-arms, and causing them to act as reel-arms; and Fig. 5 is a perspective view of the arm or crane which supports the eccentric pivot to which the rake and reel arms are linked.

Similar letters of reference denote corresponding parts of the machine wherever used.

The invention relates to that class of reaping-machines employing a combined rake and reel, the arms of which rotate about a vertical, or nearly vertical, shaft, and in which the rising and falling movements of the arms, either wholly or in part, are controlled by links connecting said arms with an eccentric pivot; and consists, first, in a novel means for adapting any one or more of the arms to act automatically as rake-arms, while, at the same time, placing said arm or arms under the control of the driver in his seat on the machine, enabling him, when the arms are thus set to act automatically as rake-arms, to cause them to act as reel or gathering arms only. It further consists in a novel construction of the extensible toggle-link connecting the rake and reel arms with the eccentric pivot, whereby said link is firmly locked and made unvarying in length when connected with a reel or gathering arm, but the lock of which is tripped for permitting the extension of the link when the arm to which it is connected is set to act as a rake-arm, as hereinafter explained.

In the drawings, A represents the rake-standard, which is bolted to the main frame of the machine, and in which the vertical rake-shaft or pivot B is rigidly secured. Upon this shaft is mounted the crown or bevel wheel C, to which motion is imparted by a bevel-pinion, C', connected with, and driven from, the the main ground and driving wheel D by any usual or preferred arrangement of gearing. The upper face of this wheel is provided with sockets or vertical lugs or ears $c$, in which the inner or heel ends of the rake-arms are pivoted, and above the wheel C on the shaft B is an arm or crane-post, E, in the outer end of which is secured the eccentric pivot or shaft $e$, to which the rake-arms are connected by links F attached to the rake-arms at a point outside of, or eccentric to, the heel-pivot and shaft of said arms. The sleeve which connects this arm or crane with the rake-shaft is made adjustable around the shaft as a center, for varying the points at which the rake-heads enter and leave the grain, and is held at any desired point of adjustment by a set-screw, $e^1$.

Ordinarily the arm E will be placed inclining slightly forward from a line parallel with the finger-bar, so as to bring its outer end a little forward of the finger-bar, thereby causing the rake-heads to descend the lowest at that point, and enabling the rake-teeth to pick up fallen and tangled grain in advance of the cutters; but the position of the arm may be varied as the condition of the crop may suggest.

The rake-arms G are forked or slotted at their pivoted ends, and a dog, $h$, is placed in said forked end upon the same pivot $g$ which connects the rake-arm with the rake-head or crown-wheel C. Between each rake-pivot and the shaft other ears or lugs $c^1$ are formed or secured upon the rake-head or wheel, in which a second dog or pawl, $h^1$, is pivoted, one for each arm, designed to be used as a rake-arm, and upon the outer end of this pawl $h^1$ is formed a hook, $h^2$, adapted to engage with a shoulder at $h^3$ on the upper face of the outer dog $h$. The frame or rake-standard A has an inwardly-projecting arm, A', formed upon it, the outer end of which is provided with a vertical cylindrical socket, in which is mounted a vertical pivot, $a$, to the upper end of which a curved track, $a'$, is connected, said track conforming in curvature to substantially the arc of a circle described by the portion of the rake-arm moving over it. The upper edge of this way or track has a horizontal flange projecting outwardly from it, and overhanging a friction-roller, $g^1$, attached to the lower face of the rake and reel arms, for holding said arms down to their work when acting as rake-arms. A spring at $a^x$, surrounding the pivot $a$ of the curved track $a'$, serves by its tension to hold the forward end of the track pressed inward against the periphery of the wheel or rake-head C, except when forced outward by the dog $h$, as will be explained. Within the slot in the rake-arm or socket-piece G, and outside of a web or bar, $g^2$, crossing said slot, is pivoted one arm, $f$, of the toggle-link, and to the outer end of this arm or part $f$, overhanging the rake-arm, the outer end of the link F is attached. The outer end of this angular arm or part $f$ rests upon the rake-arm, and an extension of its inner or heel end rests underneath and against the web $g^2$, underneath which, also, is pivoted a small elbow-lever, $i$, the upper arm of which is held outward, engaged with the lower inner end of the pivoted link or arm $f$ by means of a spring, $i^1$, for locking said arm in the position described. The lower arm of the lever $i$, in this position, overhangs the friction-roller $g^1$, and rests in contact, or in close proximity, therewith. (See $i^x$, Fig. 2.)

Supposing the parts to be in the position and under the arrangement shown and described, when the parts are in operation the end of the dog or pawl $h$ overhanging the rake-head and bevel-wheel C comes in contact with the forward beveled end of the track $a'$, and, crowding it outward over the roller $g^1$, causes the horizontal flange thereon to force the lower end of the elbow-lever $i$ outward, overcoming the tension of the spring $i'$, and releasing the heel end of the arm $f$ of the toggle-link, leaving said arm free to swing on its pivot, and thus to give the increased length of link necessary to permit the arm G to follow the path required to cause it to act as a rake-arm, and to which path it is held by the horizontal flange on the track $a'$ overhanging the roller $g^1$ on the rake-arm. After the roller escapes from the track $a'$, the rake is raised by the usual inclined track or way, causing it to approach the eccentric shaft $e$, until the arm $f$ comes again in contact with the rake-arm, when it is locked in position by the elbow-lever $i$, as before. Upon the outer side of the main frame is pivoted an arm, J, which extends upward and forward from its pivot, and is provided with a horizontal track, J', located in front of the bevel-wheel and curved horizontally in the arc of a circle conforming to the track described by the outer end of the dog $h$. Near the upper end of the arm J is a pin or spur, $j$, from which a link, $k$, extends forward and is connected with a crank-arm on the inner end of a rock-shaft, $k'$, mounted in a sleeve or arm, K, secured to the pivoted tongue-socket L. The outer end of this rock-shaft extending beyond the outer face of the driving-wheel has a second crank-arm from which a rod, $m$, extends backward, passing through a guiding-loop or eye secured to an upright, M, attached to the driver's-seat support, as shown by dotted lines in Fig. 1. A stirrup, $m'$, is secured to the rod $m$ within convenient reach of the foot of the driver in his seat, so that by pressing with his foot on said stirrup a forward thrust is given to the rod, rocking the crank-shaft $k'$, which, operating through the rod $k$, rocks the track J' upward and backward, causing it to lift the pawl $h$ until the hook $h^2$ on the pawl $h^1$ engages with the shoulder $h^3$ on the pawl $h$, in which position said pawl passes above the track $a'$ without actuating it, thus causing the arm which had been set to act as a rake-arm to act as a reel or gathering-arm only. The dogs or pawls $h$ $h^1$ may be applied to any one or more or to all of the arms, and such arm or arms will be made to act automatically as rake-arms, subject to the option of the driver in operating the pivoted track J', as described. When the dog $h$ is caught and held up by the pawl $h^1$, as described, it becomes necessary to release it to cause it to resume its function of rake-arm, and this is effected by causing the heel end of the dog or pawl $h^1$ to pass under a projecting spur, $e^2$, formed on the rear of the sleeve of the arm or crane E, (see Fig. 5,) which lifts the outer end of the pawl $h^1$ until the shoulder $h^3$ is freed therefrom, when the dog $h$ drops down upon the upper face of the crown-wheel C, and resumes its action on the track $a'$, as before. Where it is desired that a part of the arms G shall act as reel-arms only, the pawls $h^1$ connecting with such arms are removed, and the position of the dogs $h$ is reversed, with the swinging ends placed underneath, and secured by the pin or pivot of the dog $h^1$, as shown in Fig. 3, when, there being nothing to actuate the track $a'$, or to release the locked arm $f$ of the toggle-link connection of the reel-arms with the eccentric pivot $e$, such arms are compelled to pursue the uniform path of reel-arms. The links F are jointed each to an independent swiveling-plate, $f'$, mounted and turning freely on the eccentric pivot $e$, the several plates $f'$ being located one above another on said pivot, as shown in Fig. 2. By this arrangement the links F are always maintained in a position radial to the pivot $e$, and the lateral deflection and consequent cramping of the links, resulting from attaching them to a single rotating disk or spider, are avoided. Above the washer which holds the plates $f'$ on the pivot $e$, and between said washer and the retaining-nut, is secured a shield or cover, H, made irregular in form, as indicated by the dotted lines in Fig. 1, and conforming in outline to the path described by the pivoted rake-arms. This shield droops at its outer or platform side, overhanging the pivots and jointed links of the rake and reel arms, and prevents the straw as it is reeled in, from coming in contact with and obstructing the action of the mechanism actuating said arms.

Parts of the machine not particularly described may be constructed and arranged in any usual or preferred manner.

Having now described my improvements, what I claim as new, and desire to secure by Letters Patent, is—

1. The pivoted track or way $a'$, in combination with the dog or pawl $h$, on the rotating rake-head or crown-wheel, substantially as described.

2. The pivoted dog $h$ for actuating the rake-track $a'$, in combination with the locking-pawl $h^1$, for holding the dog $h$ away from said track $a'$, as described.

3. The dog or pawl $h$, which actuates the rake-track $a'$, in combination with the locking-pawl $h^1$ and the pivoted track $J'$, controlled by the attendant in his seat on the machine, substantially as described, whereby said attendant is enabled to cause the arm or arms set to act as rake-arms, to act as reel or gathering arms only.

4. The combination of the locking-lever $i$, with the arm $f$ of the toggle-link connection between the rake and reel-arms and the eccentric pivot, substantially as described.

5. The crane post or arm E provided with the tripping-spur $e^2$, for raising the pawl $h^1$, and releasing the dog $h$, as described.

WILLIAM ANSON WOOD.

Witnesses:
ADIN THAYER,
FRANK S. NIVER.